(12) United States Patent
Kurauchi et al.

(10) Patent No.: US 12,283,098 B2
(45) Date of Patent: Apr. 22, 2025

(54) BARRIER DATA COLLECTION DEVICE, BARRIER DATA COLLECTION METHOD, AND BARRIER DATA COLLECTION PROGRAM

(71) Applicant: NIPPON TELEGRAPH AND TELEPHONE CORPORATION, Tokyo (JP)

(72) Inventors: Yuki Kurauchi, Tokyo (JP); Naoto Abe, Tokyo (JP); Hitoshi Seshimo, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 519 days.

(21) Appl. No.: 17/620,063

(22) PCT Filed: Jun. 19, 2019

(86) PCT No.: PCT/JP2019/024335
§ 371 (c)(1),
(2) Date: Dec. 16, 2021

(87) PCT Pub. No.: WO2020/255304
PCT Pub. Date: Dec. 24, 2020

(65) Prior Publication Data
US 2022/0366685 A1   Nov. 17, 2022

(51) Int. Cl.
*G06V 20/17* (2022.01)
*G05D 1/00* (2024.01)
(Continued)

(52) U.S. Cl.
CPC ............ *G06V 20/17* (2022.01); *G05D 1/101* (2013.01); *G06T 7/62* (2017.01); *G06T 7/70* (2017.01);
(Continued)

(58) Field of Classification Search
None
See application file for complete search history.

(56) References Cited

U.S. PATENT DOCUMENTS

2016/0082597 A1 * 3/2016 Gorshechnikov .... G06V 10/462
901/1
2017/0337824 A1 * 11/2017 Chen .................... G08G 5/0086

FOREIGN PATENT DOCUMENTS

JP       2019064584 A  *  4/2019  ........... B64C 39/024

OTHER PUBLICATIONS

Cetin et al., Establishing Obstacle and Collision Free Communication Relay for UAVs with Artificial Potential Fields, 2013, J Intell Robot Syst 69, pp. 361-372, doi.org/10.1007/s10846-012-9761-y.*

* cited by examiner

*Primary Examiner* — Guillermo M Rivera-Martinez

(57) ABSTRACT

A barrier data collection device includes a unit estimation unit that estimates, based on sensor data with position information including height at a time when a mobile body including a flying mobile body moving in the air moves, the sensor data being collected in advance about each of geographical ranges, with an estimator, about each of sets of the geographical ranges and heights included in the sensor data in a predetermined time unit, a barrier state obtained by estimating a state of which of barrier types the set is, a shape estimation unit that estimates, about a set satisfying a condition among the sets, a barrier shape based on the sensor data and an estimation result of the barrier state estimated about each of the sets in the time unit.

12 Claims, 10 Drawing Sheets

(51) Int. Cl.
  *G06T 7/62* (2017.01)
  *G06T 7/70* (2017.01)
  *G06V 20/64* (2022.01)
  *B64U 101/30* (2023.01)

(52) U.S. Cl.
  CPC .......... *G06V 20/64* (2022.01); *B64U 2101/30* (2023.01); *B64U 2201/10* (2023.01); *G06T 2207/10032* (2013.01); *G06T 2207/30181* (2013.01); *G06T 2207/30261* (2013.01)

Fig. 5

| TIME (MILLISECOND) | ACCELERATION X | ACCELERATION Y | ACCELERATION Z | ... | LATITUDE | LONGITUDE | ALTITUDE |
|---|---|---|---|---|---|---|---|
| 1482316746628 | -2.05482 | 0.702102 | 9.8300 | | 35.72046694 | 139.56573849 | 5.5 |
| 1482316746632 | -1.88484 | 1.06123 | 9.6480 | | | | |
| 1482316746638 | -1.52091 | 1.11630 | 9.5139 | | | | |
| 1482316746643 | -1.2814941 | 1.1115112 | 9.468475 | | | | |

Fig. 8

| GEOGRAPHICAL RANGE ID | OBSTACLE | WIND | LIVING THING | SHAPE | HEIGHT | ... |
|---|---|---|---|---|---|---|
| 0005 | 0.78 | 0.12 | 0.10 | DENDRITIC, WIDTH 5 m | 30 m | |
| 0006 | 0.32 | 0.44 | 0.24 | — | 10 m | |
| 0006 | 0.11 | 0.22 | 0.67 | — | 50 m | |

Fig. 10

| GEOGRAPHICAL RANGE ID | OBSTACLE | WIND | LIVING THING | BARRIER TYPE | SHAPE | HEIGHT | ... |
|---|---|---|---|---|---|---|---|
| 0005 | 0.78 | 0.12 | 0.10 | OBSTACLE | DENDRITIC, WIDTH 5 m | 30 m | |
| 0005 | 0.78 | 0.12 | 0.10 | OBSTACLE | DENDRITIC, WIDTH 5 m | 10 m | |
| 0006 | 0.32 | 0.44 | 0.24 | WIND | — | 10 m | |
| 0006 | 0.11 | 0.22 | 0.67 | LIVING THING | — | 50 m | |

BARRIER DATA COLLECTION DEVICE, BARRIER DATA COLLECTION METHOD, AND BARRIER DATA COLLECTION PROGRAM

CROSS-REFERENCE TO RELATED APPLICATIONS

This application is a U.S. National Stage Application filed under 35 U.S.C. § 371 claiming priority to International Patent Application No. PCT/JP2019/024335, filed on 19 Jun. 2019, the disclosure of which is hereby incorporated herein by reference in its entirety.

TECHNICAL FIELD

The technique of the disclosure relates to a barrier data collection device, a barrier data collection method, and a barrier data collection program.

BACKGROUND ART

There has been a method of collecting barriers, which are obstacles, on a road surface. When a flying mobile body such as a drone moves in the air, various barriers such as electric wires and trees are present in the air.

As a technique for collecting barriers concerning the flying mobile body, there is, for example, a technique for performing route design using a risk value in mesh units for each height (see Non-Patent Literature 1).

CITATION LIST

Non-Patent Literature

Non-Patent Literature 1: NTT data, "Demonstration of Operation Management System for Same Airspace and Multiple Drones", [Mar. 2019]

SUMMARY OF THE INVENTION

Technical Problem

However, in the technique of Non-Patent Literature 1, sensing is necessary at respective heights in the entire range in the air. Since the sensing has to be performed at the respective heights, collection efficiency of barrier states is assumed to be low.

An object of the technique of the disclosure, which has been made in view of the above points, is to provide a barrier data collection device, a barrier data collection method, and a barrier data collection program that can efficiently collect barrier data.

Means for Solving the Problem

A first aspect of the present disclosure is a barrier data collection device including: a unit estimation unit that estimates, based on sensor data with position information including height at a time when a mobile body including a flying mobile body moving in the air moves, the sensor data being collected in advance about each of geographical ranges, with an estimator, about each of sets of the geographical ranges and heights included in the sensor data in a predetermined time unit, a barrier state obtained by estimating a state of which of barrier types the set is; a shape estimation unit that estimates, about a set satisfying a condition among the sets, a barrier shape based on the sensor data and an estimation result of the barrier state estimated about each of the sets in the time unit; and a barrier estimation unit that estimates, based on the estimation result of the barrier state estimated about the each of the sets, the estimated barrier shape, and a correct answer ratio of the estimator calculated in advance, a probability for each of the barrier types corresponding to each of the sets and estimates the barrier type corresponding to the set from the estimated probability for each of the barrier types.

A second aspect of the present disclosure is a barrier data collection method in which a computer executes processing including: estimating, based on sensor data with position information including height at a time when a mobile body including a flying mobile body moving in the air moves, the sensor data being collected in advance about each of geographical ranges, with an estimator, about each of sets of the geographical ranges and heights included in the sensor data in a predetermined time unit, a barrier state obtained by estimating a state of which of barrier types the set is; estimating, about a set satisfying a condition among the sets, a barrier shape based on the sensor data and an estimation result of the barrier state estimated about each of the sets in the time unit; and estimating, based on the estimation result of the barrier state estimated about the each of the sets, the estimated barrier shape, and a correct answer ratio of the estimator calculated in advance, a probability for each of the barrier types corresponding to each of the sets and estimating the barrier type corresponding to the set from the estimated probability for each of the barrier types.

A third aspect of the present disclosure is a barrier data collection program for causing a computer to execute: estimating, based on sensor data with position information including height at a time when a mobile body including a flying mobile body moving in the air moves, the sensor data being collected in advance about each of geographical ranges, with an estimator, about each of sets of the geographical ranges and heights included in the sensor data in a predetermined time unit, a barrier state obtained by estimating a state of which of barrier types the set is; estimating, about a set satisfying a condition among the sets, a barrier shape based on the sensor data and an estimation result of the barrier state estimated about each of the sets in the time unit; and estimating, based on the estimation result of the barrier state estimated about the each of the sets, the estimated barrier shape, and a correct answer ratio of the estimator calculated in advance, a probability for each of the barrier types corresponding to each of the sets and estimating the barrier type corresponding to the set from the estimated probability for each of the barrier types.

Effects of the Invention

According to the technique of the disclosure, it is possible to efficiently collect barrier data.

BRIEF DESCRIPTION OF DRAWINGS

FIG. 5 is a diagram showing an example of sensor data stored in a sensor data DB.

FIG. 8 is a diagram showing an example of data stored in a barrier state DB.

FIG. 10 is a diagram showing an example of data stored in a barrier data DB.

DESCRIPTION OF EMBODIMENTS

Figure 1:
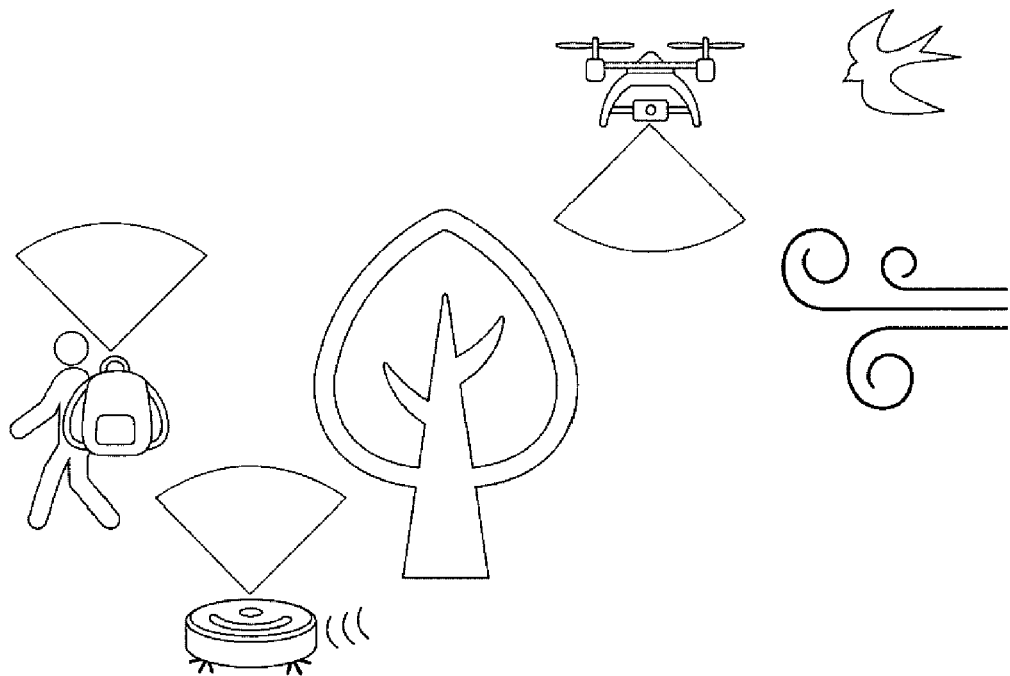
FIG. 1 is an image diagram showing a relation between various sensors and barriers, which are obstacles.

An example of an embodiment of the technique of the disclosure is explained below with reference to the drawings. Note that the same or equivalent components and portions are denoted by the same reference numerals and signs in the drawings. Dimension ratios of the drawings are exaggerated for convenience of explanation and are sometimes different from actual ratios.

First, an overview of the technique of the present disclosure is explained. FIG. 1 is an image diagram showing a relation between various sensors and barriers, which are obstacles. In the embodiment explained below, as shown in FIG. 1, barrier states of barriers present in the air are estimated by the various sensors. In the case of the air, variation occurs in a type of a barrier that should be taken. Examples of a target to be an obstacle not described in a map include obstacles such as trees, utility poles, and buildings present on roads, wind in a determined direction such as building wind, and living things such as a bird strike. The position of a barrier is not two dimensions on a road surface but three dimensions including an up-down direction in the air. Accordingly, sensors in use are not limited to speed and the like. Ultrasound, thermography, sound, and the like can be added.

Figure 2:
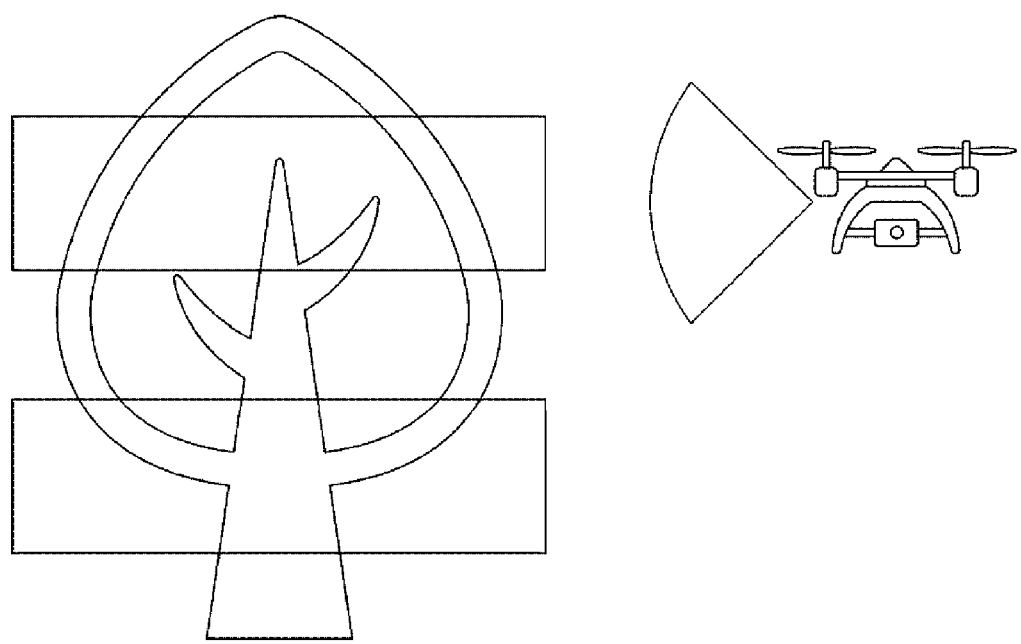
FIG. 2 is an image diagram in the case in which a barrier in a downward direction is estimated by a sensor of a mobile flying body.

In the related art, there is a problem in that collection efficiency is low because sensing is necessary at respective heights in the air. Therefore, in this embodiment, a barrier shape of a barrier is estimated from sensor data and the barrier is registered according to the barrier shape. Consequently, a frequency of sensing around an obstacle and sensing at other heights is reduced to enable efficient sensing. FIG. 2 is an image diagram of a case in which a barrier in a downward direction is estimated by a sensor of a mobile flying body. As shown in FIG. 2, when a barrier shape of an upper portion of a tree is estimated, it is estimated based on the estimated barrier shape that a barrier is probabilistically present in a downward direction as well.

A configuration in this embodiment is explained below. In the following explanation, a case in which sensor data is collected from a flying mobile body (hereinafter simply described as mobile body) moving in the air such as a drone and a barrier state is estimated is explained as an example. Note that the mobile body may be any mobile body that can acquire sensor data in the air.

Figure 3:
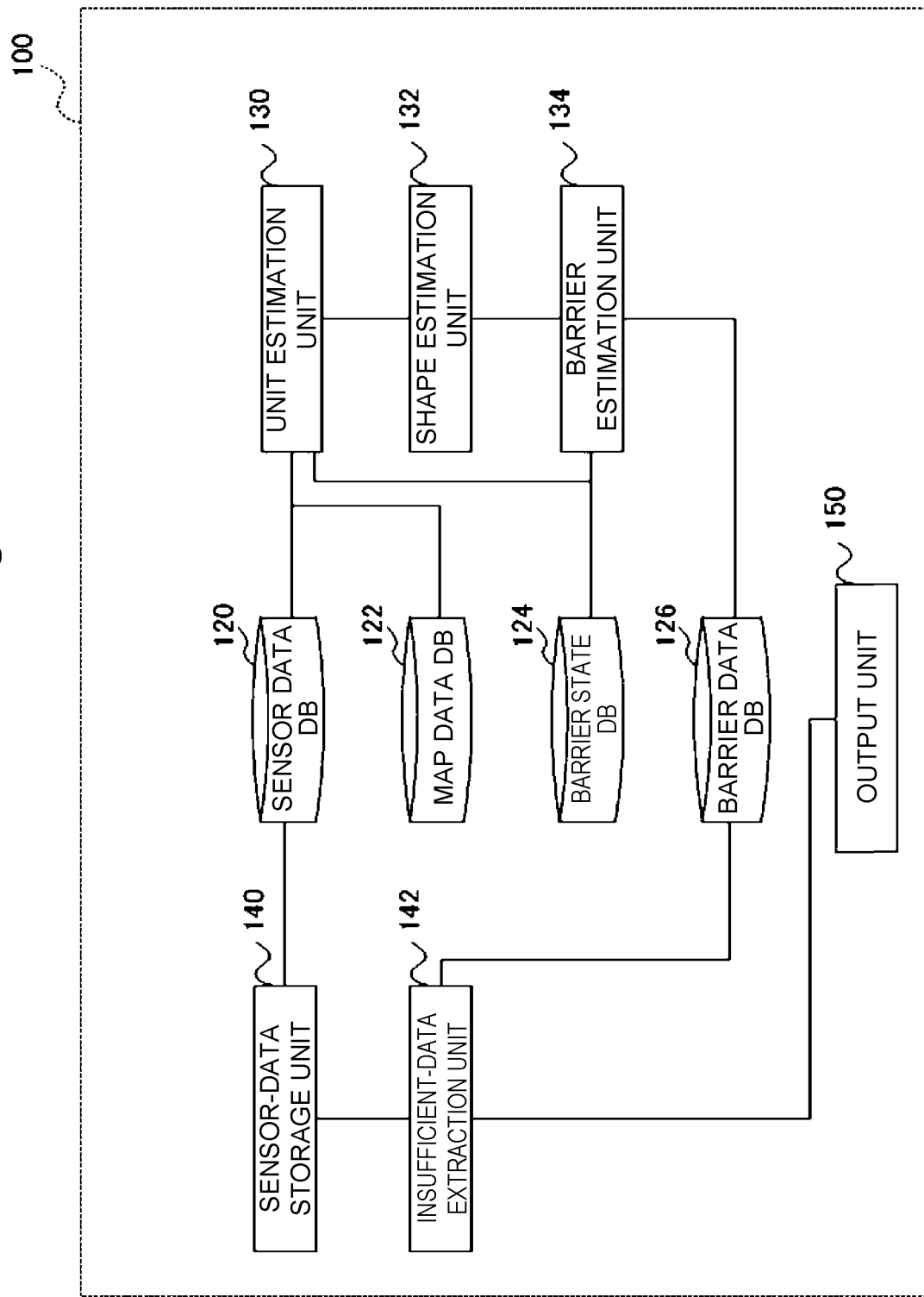
FIG. 3 is a block diagram showing the configuration of a barrier data collection device in an embodiment.

FIG. 3 is a block diagram showing the configuration of a barrier data collection device in this embodiment.

As shown in FIG. 3, a barrier data collection device 100 includes a sensor data DB 120, a map data DB 122, a barrier state DB 124, a barrier data DB 126, a unit estimation unit 130, a shape estimation unit 132, and a barrier estimation unit 134. The barrier data collection device 100 includes a sensor-data storage unit 140, an insufficient-data extraction unit 142, and an output unit 150.

Figure 4:
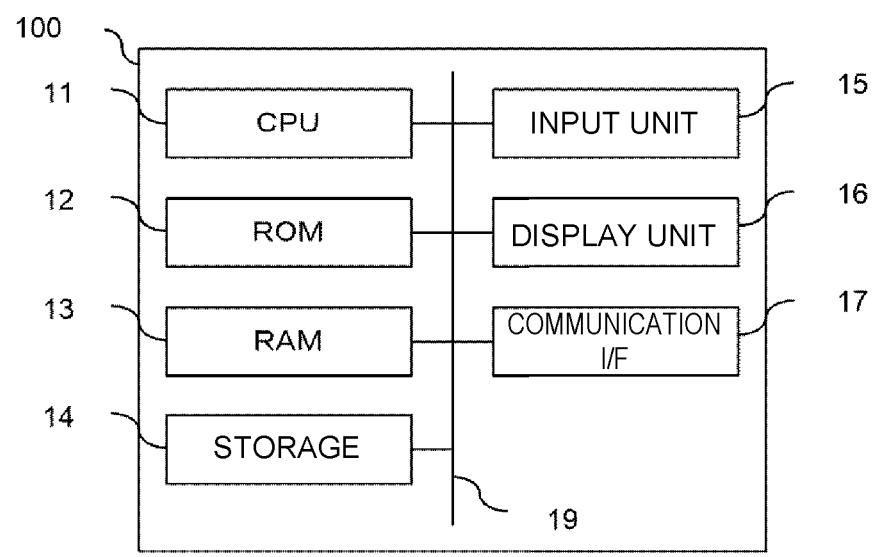
FIG. 4 is a block diagram showing a hardware configuration of the barrier data collection device.

FIG. 4 is a block diagram showing a hardware configuration of the barrier data collection device 100.

As shown in FIG. 4, the barrier data collection device 100 includes a CPU (Central Processing Unit) 11, a ROM (Read Only Memory) 12, a RAM (Random Access Memory) 13, a storage 14, an input unit 15, a display unit 16, and a communication interface (I/F) 17. The components are communicably connected to one another via a bus 19.

The CPU 11 is a central arithmetic processing unit and executes various programs and controls the units. That is, the CPU 11 reads the programs from the ROM 12 or the storage 14 and executes the programs using the RAM 13 as a work area. The CPU 11 performs control of the components and various kinds of arithmetic processing according to the programs stored in the ROM 12 or the storage 14. In this embodiment, a barrier data collection program and a sensor data collection program are stored in the ROM 12 or the storage 14.

The ROM 12 stores various programs and various data. The RAM 13 functions as a work area and temporarily stores programs or data. The storage 14 is configured by an HDD (Hard Disk Drive) or an SSD (Solid State Drive) and stores various programs including an operating system and various data.

The input unit 15 includes a pointing device such as a mouse and a keyboard and is used to perform various inputs.

The display unit 16 is, for example, a liquid crystal display and displays various kinds of information. The display unit 16 may adopt a touch panel type and function as the input unit 15.

The communication interface 17 is an interface for communicating with other apparatuses such as terminals. A standard such as Ethernet (registered trademark), FDDI, or Wi-Fi (registered trademark) is used as the communication interface 17.

Subsequently, functional components of the barrier data collection device 100 are explained. The functional components are realized by the CPU 11 reading the barrier data collection program stored in the ROM 12 or the storage 14, developing the barrier data collection program in the RAM 13, and executing the barrier data collection program. Processing of the barrier data collection device 100 is divided into barrier data collection processing and sensor data collection processing.

The barrier data collection device 100 receives sensor data at the time when the mobile body moves in each of geographical ranges, the sensor data being acquired by a sensor attached to the mobile body. The sensor data is stored in the sensor data DB 120 by the sensor-data storage unit 140.

The sensor data stored by the sensor-data storage unit 140 is stored in the sensor data DB 120. The sensor data is continuously or intermittently acquired. The sensor data is sensor data with position information and is configured by sensor information collected by the sensor included in the mobile body and position information of the sensor at the time when the sensor data is collected. The sensor information includes time in millisecond units, acceleration (X, Y, Z), gyro, air pressure, temperature, humidity, echo by ultrasound or sound, and thermography. The position information is latitude, longitude, and altitude obtained by satellite positioning such as a GPS, positioning by a network, or the like. FIG. 5 is a diagram showing an example of the sensor data stored in the sensor data DB 120. The sensor data is mainly stored from the sensor-data storage unit 140 but may be stored from the outside. Sensor data explained below is acquired from the sensor data DB 120.

Map data defining a geographical range in the real world as "geographical range" is stored in the map data DB 122. The geographical range is defined by a region designated by a polygon or a network designated by a set of nodes and links and can be identified by a geographical range ID.

Examples of map data defining a region with a polygon include an area-wide mesh for dividing the land of Japan into rectangles according to latitude and longitude (see Non-Patent Literature 4).

[Non-Patent Literature 4] Statistic Bureau, Ministry of Internal Affairs and Communications. Characteristics and a history of Area-Wide Mesh Statistics.

Figure 6:
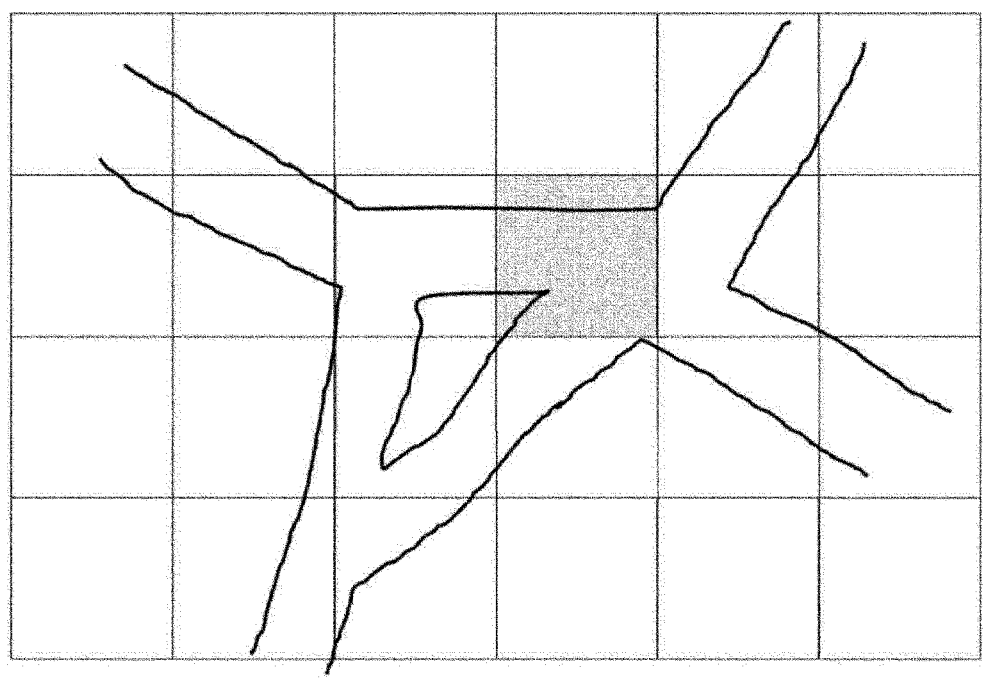
FIG. 6 is a diagram showing an example of a case in which a geographical range is represented by a mesh.

For example, a geographical range is represented by a polygon defining the external shape of the geographical range and is defined by a geographical range ID and a set of coordinates of points forming the polygon. As an example of the geographical range represented by the polygon, an example of a geographical range represented by a mesh is shown in FIG. 6.

Figure 7:
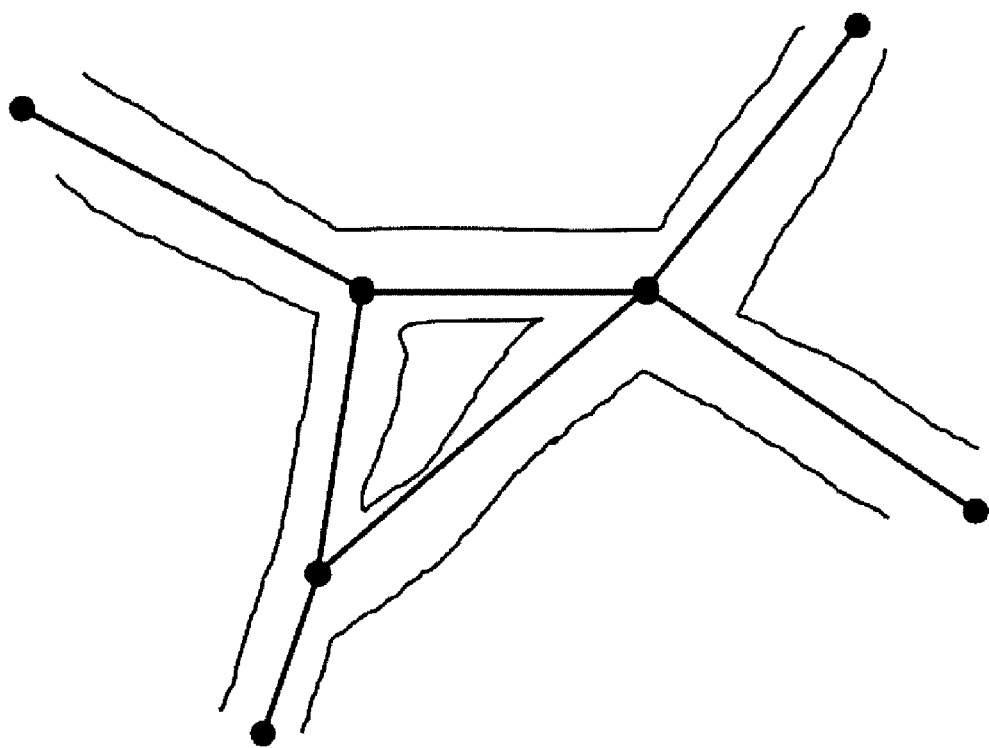
FIG. 7 is a diagram showing an example of a geographical range represented by a line of a set of points and lines.

As another example, a geographical range is represented by points representing a route and a set of lines, which is an order list of the points, and is defined by a geographical range ID and a set of points and lines. An example of a geographical range represented by a line of a set of points and lines is shown in FIG. 7.

When a position of sensor data is given, the position is associated with a range on map data. For example, when a geographical range is represented by a set of polygons without gaps, according to a simplest example, a polygon to which points belong is set as a geographical range to which the sensor data belongs.

When a geographical range is represented by lines, in a simplest example, a line at the closest distance to a position of sensor data is set as a geographical range to which the sensor data belongs.

The unit estimation unit 130 estimates, based on the sensor data, with an estimator, about each of sets of the geographical ranges and heights included in the sensor data in a predetermined time unit, a barrier state obtained by estimating a state of which barrier types the set is.

The barrier types indicate types of barriers present in a space that can be identified by the sensor data. The barrier types include states such as "obstacle", "wind", and "living thing".

Specifically, the unit estimation unit 130 performs the following processing 1 to 4. In the processing 2, the unit estimation unit 130 performs processing for each of sensor data recorded at every time in a predetermined time unit, counts a state of a barrier type at every time, and estimates a barrier state in a predetermined time unit (for example, 100 milliseconds). Note that the unit estimation unit 130 may use a minimum unit arranged by, for example, averaging sensor data at several milliseconds to several ten milliseconds and perform the processing in each minimum unit.

As the processing 1, first, the unit estimation unit 130 reads sensor data from the sensor data DB 120. As the sensor data in the sensor data DB 120, sensor data having time in millisecond units as a minimum time unit is used.

As the processing 2, the unit estimation unit 130 performs, on the sensor data at every time in the predetermined time unit, using the estimator, estimation of a barrier type at every time and obtains an estimation result at every time.

The estimator used for the estimation can use a model learned to individually estimate a barrier type.

The estimation of the barrier type by the estimator is performed according to class classification. For example, the estimation of the barrier type by the estimator is given by three values such as {obstacle, wind, living thing}. Note that the class classification may be two values, five values, or the like.

The unit estimation unit 130 performs the next processing 3 in parallel to the processing 2.

As the processing 3, the unit estimation unit 130 sets each of sets of geographical ranges and heights based on position information of sensor data at times in the predetermined time unit. The setting of the geographical ranges extracts a geographical range ID matching position information from map data of the map data DB 122. The position information is given by, for example, a set of latitude and longitude. The extracted geographical range ID and the height obtained by the sensor data are paired as a set.

As the processing 4, the unit estimation unit 130 associates the estimation result of the barrier type estimated in the processing 2 with each of the sets of the geographical IDs and the heights of the sensor data set in the processing 3 and records the estimation result of the barrier type in the barrier state DB 124 as an estimation result of a barrier state. For example, when a barrier type of a set of a geographical range ID 5 and height of 30 m is estimated as "obstacle" as an estimation result of a barrier state of certain sensor data of a certain set, the unit estimation unit 130 counts up the obstacle in the geographical range ID 5 at the height of 30 m in the barrier state DB 124 by one. Finally, the unit estimation unit 130 sets, as the estimation result of the barrier state, a count result of a barrier type estimated in the predetermined time unit. In the following explanation, a barrier state means a count result of a barrier type.

FIG. 8 is a diagram showing an example of data stored in the barrier state DB 124. As shown in FIG. 8, a number for each of estimated barrier types is counted and stored in the barrier state DB 124 for each of combinations of geographical IDs and heights. Note that an item of a shape is estimated by the shape estimation unit 132 explained below.

Depending on an implementation form, a sensor ID of a sensor, which is an acquisition source, may be given to source sensor data for each acquisition unit. The source sensor ID may be added to an estimated barrier state for each of geographical ranges and then stored. At this time, when estimation of a barrier state in time units is executed about the same sensor ID in a more excellent scheme already executed, sensor data for the stored same sensor data ID can be replace with sensor data obtained anew. Depending on an implementation form, when a geographical range ID and a range of height change, processing efficiency can be improved by increasing or reducing only the number of estimation results of barrier states.

The above is the explanation about the processing 1 to 4 of the unit estimation unit 130.

The shape estimation unit 132 estimates, about a set satisfying a condition among sets of geographical ranges and heights included in sensor data, a barrier shape based on the sensor data and an estimation result of a barrier state estimated about each of sets. The shape estimation unit 132 records the estimated barrier shape in the item of the shape of the barrier state DB 124.

For example, when a condition defined about a set is that a ratio of an obstacle in a barrier state of the set is equal to or larger than a threshold, the shape estimation unit 132 estimates, about a set satisfying the condition, from the sensor data, a shape and a lateral width of an object corresponding to the obstacle as a barrier shape. The barrier shape is a shape of the object estimated from the sensor data. The shape of the object only has to be estimated from sensor data representing the shape of the object such as echo by ultrasound or thermography among the sensor data. As shown in FIG. 8, for example, a dendritic shape representing a tree and a lateral width as the shape of the object "dendritic, width 5 m" can be estimated as the barrier shape. The barrier shape can be estimated in the same manner for other objects that can be estimated from the sensor data. Examples of the object include a utility pole and a building.

The barrier estimation unit 134 estimates based on the estimation result of the barrier state estimated about each of the sets, the estimated barrier shape, and a correct answer ratio of the estimator calculated in advance, a probability for each of barrier types corresponding to each of the sets. The barrier estimation unit 134 estimates a barrier type corresponding to the set from the estimated probability for each of the barrier types. The barrier estimation unit 134 stores the estimated probability for each of the barrier types, the barrier type, and the shape estimated by the shape estimation unit 132 in the barrier data DB 126 together.

The estimation of the probability for each of the barrier types is explained. It is assumed that a correct answer rate of a result is clear about the estimator used in the estimation of the barrier state. A value of the correct answer ratio is obtained by accuracy evaluation for a model obtained as a result of supervised learning. From the correct answer ratio and a set of estimation results of a barrier state in a position associated with a certain set of a geographical range and height, a barrier type in the set can be probabilistically calculated.

A specific example of processing of the estimation of the barrier type is explained below. It is assumed that, for convenience, the barrier type is classified into two values of {obstacle, others (other than the obstacle)} and the barrier type is represented by the two values.

A real barrier type is represented as X, an estimated barrier type is represented as x, and a probability of estimating, with a selected estimator, a place where reality is X is estimated as x is represented as P(x|X). For example, a case in which teacher data (a real barrier type) is "obstacle" (Barrier) is written as A and estimated data being "obstacle" is written as a, a probability of estimating an obstacle as "obstacle" can be written as P(a|A). Similarly, the teacher data being "others" (Accessible) is written as B and the estimated data being "others" is written as b. A real place being "obstacle" and the real place being "others" are respectively represented as P(A) and P(B). At this time, from one estimation x, a probability P(A|x) of the "obstacle" being present in the place can be written as the following Expression (1) according to the Bayes' theorem.

[Math. 1]

$$P(A \mid x) = \frac{P(A)P(x \mid A)}{\sum_{X \in \{A,B\}} P(X)P(x \mid X)} = \frac{P(A)P(x \mid A)}{P(A)P(x \mid A) + P(B)P(x \mid B)} \quad (1)$$

From a plurality of estimations of barrier types, a probability of a barrier type in a certain place being an obstacle is calculated. It is assumed that, in a place where a barrier type is desired to be learned, n times of estimations are obtained as a list $x=(x_1, x_2, X_n) \in \{a, b\}^n$. If a appears r times, and b appears n−r times in x, the probability is calculated as follows.

$$P(x \mid X) = \binom{n}{r} P(a \mid X)^r P(b \mid X)^{n-r}$$

where, $$\binom{n}{r}$$

is a combination. Accordingly, a probability P(A|x) of a real barrier type of this place being A is calculated as indicated by the following Expression (2).

[Math. 2]

$$P(A \mid x) = \frac{P(A)P(x \mid A)}{\sum_{X \in \{A,B\}} P(X)P(x \mid X)} = \frac{P(A)\binom{n}{r}P(a \mid A)^r P(b \mid A)^{n-r}}{\sum_{X \in \{A,B\}} P(X)\binom{n}{r}P(a \mid X)^r P(b \mid X)^{n-r}} = \frac{P(A)\binom{n}{r}P(a \mid A)^r P(b \mid A)^{n-r}}{P(A)\binom{n}{r}P(a \mid A)^r P(b \mid A)^{n-r} + P(B)\binom{n}{r}P(a \mid B)^r P(b \mid B)^{n-r}} \quad (2)$$

As an example, there are the following conditions (1) to (4).

(1) A probability of any place being A (an obstacle), that is, a ratio of A in teacher data is P(A)=0.7. P(B)=0.3.

(2) A probability of being predicted as a in a place where reality is A (being predicted as "obstacle" in a place where an obstacle is present) is P(a|A)=0.8. P(b|A)=0.2.

(3) A probability of being predicted as a in a place where reality is B (being predicted as "obstacle" in a place where an obstacle is absent) is P(a|B)=0.3. P(b|B)=0.7.

(4) It is assumed that the place is estimated as being the obstacle four times out of five times. That is, n=5 and r=4.

In this case, a probability of this place being an obstacle is as indicated by the following Expression (3).

[Math. 3]

$$P(A \mid x) = \frac{0.7 \times \binom{5}{4} \times 0.8^4 \times 0.2^2}{0.7 \times \binom{5}{4} \times 0.8^4 \times 0.2^1 + 0.3 \times \binom{5}{4} \times 0.3^4 \times 0.7^1} = \frac{0.7 \times 5 \times 0.4096 \times 0.2}{0.7 \times 5 \times 0.4096 \times 0.2 + 0.3 \times 5 \times 0.0081 \times 0.7} = 0.9899 \quad (3)$$

As explained above, it is possible to perform, from the set of the estimation results of the barrier states, the estimation with the probability of the barrier type with respect to the set of the geographical range and the height.

From the above Expression (2), if the probability P(A) of any position being an obstacle is clear and the performance of the estimation of the barrier type in the set is given as P(a|A), P(a|B), a probability of a range being an obstacle can be obtained from the number of times r the position is determined to be an obstacle out of n times in a predetermined time unit.

Figure 9:
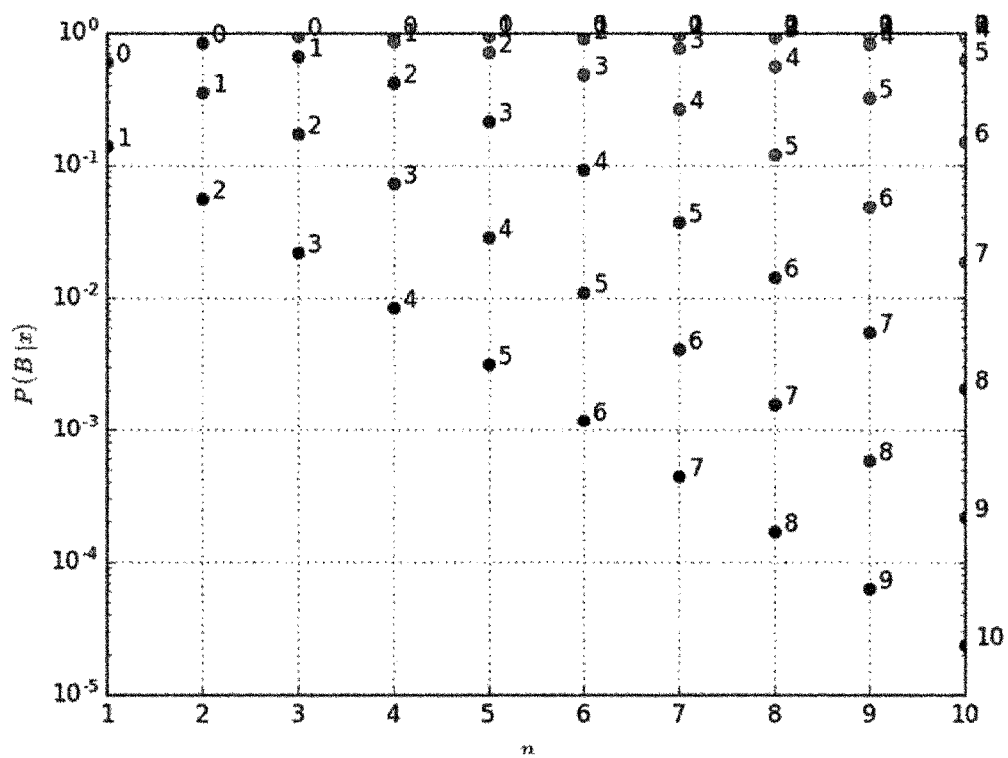
FIG. 9 is a diagram showing an example of a relation between the number of times and a probability of a barrier type.

A probability of being an obstacle according to the above condition is obtained as shown in FIG. 9. In FIG. 9, the horizontal axis indicates n. A probability of being others is shown for each number of times the position is estimated as being the obstacle among the n times. For example, when the position is estimated as being the obstacle four times out of five times, the probability of others is approximately 0.01, that is, the probability of being the obstacle is 99%.

When the graph of FIG. 9 is used, it is seen that, in order to achieve the probability of the obstacle of 99.9% (the probability of others is $10^{-3}=0.001$), the position only has to be estimated as being the obstacle seven times out of seven times, eight times out of eight times, eight times out of nine times, and nine times out of ten times.

The barrier estimation unit 134 estimates, about each of sets, a barrier type, a probability of which is equal to or larger than a threshold, as a barrier type of the set.

An example of data stored in the barrier data DB 126 is shown in FIG. 10. As shown in FIG. 10, a probability for each of barrier types, a barrier type estimated from the probability, and a shape for each of sets of geographical range IDs and heights are stored in the barrier data DB 126. Note that, since the probability of the barrier type is sometimes unknown, even if all values of rows are added up, an added-up value is sometimes not 1 (if "unknown" is added, the added-up value is 1).

As explained above, the barrier estimation unit 134 estimates, based on the estimation result of the barrier state estimated about each of the sets and the calculated correct answer ratio of the estimator, about each of the sets, a probability for each of the barrier types and estimates a barrier type from the estimated probability for each of the barrier types. The barrier estimation unit 134 estimates, based on the barrier type estimated about each of the sets and the barrier shape estimated about each of the sets, a barrier type and a barrier shape at height different from height of the set. Geographical ranges of the sets are the same. For example, a portion surrounded by a thick frame in FIG. 10 is the barrier type estimated at the different height and is a set added in the estimation processing. For example, it is assumed that, about a set of a geographical range ID 5 and height of 30 m, it can be estimated that a tree is present in the set if a shape is "dendritic, 5 m" at the height of 30 m. In this case, it can be estimated that a tree is present 30 m below as well. Accordingly, for example, a record of a set of the geographical range ID 5 and 10 m is added to the barrier data DB 126. A probability of a barrier type, a barrier type, and a shape same as the probability of the barrier type, the barrier type, and the shape in the geographical range ID 5 and at the height of 30 m are copied. The height to be added only has to be defined in advance about an original set of height and a shape. Note that, since at least only the barrier type has to be known, the probability and the shape may be left blank because the probability and the shape are not estimated about the added set.

The above is the explanation about the barrier data collection processing.

Subsequently, sensor data collection processing is explained.

When receiving sensor data, the sensor-data storage unit 140 starts processing and stores the sensor data in the sensor data DB 120.

The insufficient-data extraction unit 142 extracts, as a set in which sensor data is insufficient, a set of a geographical range and height in which a probability of a barrier type stored in the barrier data DB 126 is smaller than a predetermined threshold. Specifically, the insufficient-data extraction unit 142 compares, for each of barrier types, a probability of the barrier type with the threshold and extracts, as the set in which sensor data is insufficient, a set in which a barrier type, a probability of which is equal to or larger than the threshold, is absent. The insufficient-data extraction unit 142 transmits, with the output unit 50, an acquisition request for sensor data to a mobile body present in a geographical range of the extracted set in which sensor data is insufficient.

The threshold may be different depending on a barrier type. For example, a reference indicating that a probability of a barrier type being an obstacle has to be a probability equal to or higher than 70% but a probability of a barrier type other than the obstacle only has to be 30% or more and does not need to be higher is provided.

About the mobile body to which the request is transmitted, there is a method of (1) or (2) and whichever of (1) and (2) may be adopted. (1) is a method of acquiring information concerning the mobile body from a database outside this device and transmitting a request for sensor data acquisition to the mobile body according to a condition in the geographical range. (2) is a method of releasing a request target geographical range in a system outside this device and starting acquisition of sensor data at timing when the mobile body enters the geographical range.

Subsequently, action of the barrier data collection device 100 is explained.

Figure 11:
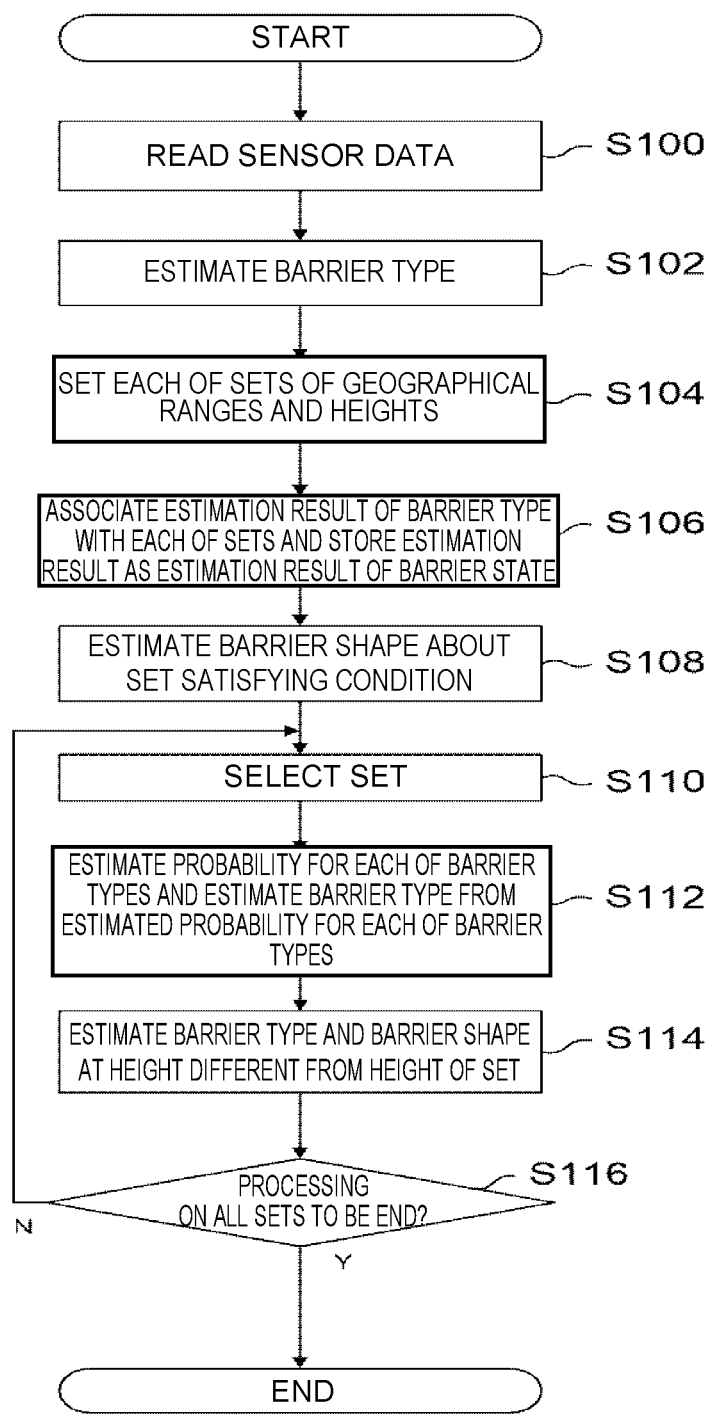
FIG. 11 is a flowchart showing a flow of barrier data collection processing by the barrier data collection device.

FIG. 11 is a flowchart showing a flow of the barrier data collection processing by the barrier data collection device 100. The CPU 11 reads the barrier data collection program from the ROM 12 or the storage 14, develops the barrier data collection program in the RAM 13, and executes the barrier data collection program, whereby the barrier data collection processing is performed.

First, in step S100, the CPU 11 reads sensor data stored in the sensor data DB 120. The sensor data is a minimum unit at every time.

Subsequently, in step S102, the CPU 11 performs, on sensor data at every time in a predetermined time unit, using an estimator, estimation of a barrier type at every time and obtains an estimation result at every time.

In step S104, the CPU 11 sets, based on position information of sensor data at times in the predetermined time unit, each of sets of geographical ranges and heights.

In step S106, the CPU 11 associates the estimation result of the barrier type estimated in step S102 with each of the sets set in step S104 and records the estimation result of the barrier type in the barrier state DB 124 as an estimation result of a barrier state.

In step S108, the CPU 11 estimates, about a set satisfying a condition among sets of geographical ranges and heights included in the sensor data, a barrier shape based on the sensor data and the estimation result of the barrier state estimated about each of sets. The CPU 11 records the estimated barrier shape in the barrier state DB 124.

In step S110, the CPU 11 selects a set.

In step S112, the CPU 11 estimates, based on the estimation result of the barrier state estimated about each of the sets and the calculated correct answer ratio of the estimator, a probability for each of the barrier types about the selected set and estimates a barrier type from the estimated probability for each of the barrier types.

In step S114, the CPU 11 estimates, based on the barrier type estimated about the selected set and the barrier shape estimated about the set, about the selected set, a barrier type and a barrier shape at height different from height of the set.

In step S116, the CPU 11 determines whether barrier types are estimated about all the sets and, if barrier types are estimated about all the sets, ends the processing and, if barrier types are not estimated about all the sets, returns to step S110, selects the next set, and repeats the processing.

Figure 12:
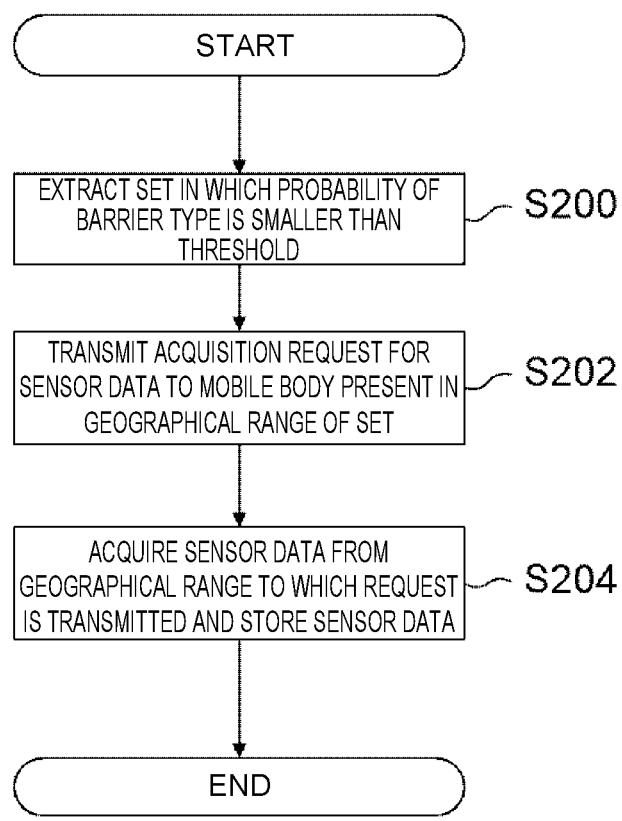
FIG. 12 is a flowchart showing a flow of sensor data collection processing by the barrier data collection device.

Subsequently, the sensor data collection processing is explained. The sensor data collection processing is periodically executed. FIG. 12 is a flowchart showing a flow of the sensor data collection processing by the barrier data collection device 100. The CPU 11 reads the sensor data collection program from the ROM 12 or the storage 14, develops the sensor data collection program in the RAM 13, and executes the sensor data collection program, whereby the sensor data collection processing is performed.

In step S200, the CPU 11 extracts, as a set in which sensor data is insufficient, a set of a geographical range and height in which a probability of a barrier type stored in the barrier data DB 126 is smaller than a predetermined threshold.

In step S202, the CPU 11 transmits, with the output unit 50, an acquisition request for sensor data to a mobile body present in the geographical range of the set in which sensor data is insufficient extracted in step S200. The height of the set may be designated in the request.

In step S204, the CPU 11 acquires sensor data from the geographical range to which the request is transmitted, stores the sensor data in the sensor data DB 120, and ends the processing. Note that the CPU 11 may notify the unit estimation unit 130 that new sensor data is acquired and cause the unit estimation unit 130 to execute the barrier data collection processing.

As explained above, with the barrier data collection device 100 in this embodiment, it is possible to efficiently collect barrier data.

Note that various processors other than the CPU may execute the barrier data collection processing and the sensor data collection processing executed by the CPU by reading software (a program) in the embodiments. As the processors in this case, a PLD (Programmable Logic Device), a circuit configuration of which can be changed after manufacturing, such as an FPGA (Field-Programmable Gate Array), a dedicated electric circuit, which is a processor including a circuit configuration exclusively designed in order to execute specific processing such as an ASIC (Application Specific Integrated Circuit), and the like are illustrated. The barrier data collection processing and the sensor data collection processing may be executed by one of these various processors or may be executed by a combination of two or more processors of the same type or different types (for example, a combination of a plurality of FPGAs and a combination of a CPU and an FPGA). Hardware structure of these various types of processors is more specifically an electric circuit obtained by combining circuit elements such as semiconductor elements.

In the embodiments, a mode in which the barrier data collection program and the sensor data collection program are stored (installed) in advance in the storage 14 is explained. However, the present disclosure is not limited to this. The programs may be provided in a form in which the programs are stored in non-transitory storage media such as a CD-ROM (Compact Disk Read Only Memory), a DVD-ROM (Digital Versatile Disk Read Only Memory), and a USB (Universal Serial Bus) memory. The programs may be downloaded from an external device via a network.

Concerning the embodiment explained above, the following notes are further disclosed.

Note 1

A barrier data collection device comprising:
a memory; and
at least one processor connected to the memory,
the processor being configured to:
estimate, based on sensor data with position information including height at a time when a mobile body including a flying mobile body moving in the air moves, the sensor data being collected in advance about each of geographical ranges, with an estimator, about each of sets of the geographical ranges and heights included in the sensor data in a predetermined time unit, a barrier state obtained by estimating a state of which of barrier types the set is;
estimate, about a set satisfying a condition among the sets, a barrier shape based on the sensor data and an estimation result of the barrier state estimated about each of the sets in the time unit; and
estimate, based on the estimation result of the barrier state estimated about the each of the sets, the estimated barrier shape, and a correct answer ratio of the estimator calculated in advance, a probability for each of the barrier types corresponding to each of the sets and estimate the barrier type corresponding to the set from the estimated probability for each of the barrier types.

Note 2

A non-transitory storage medium storing a barrier data collection program for causing a computer to execute:
estimating, based on sensor data with position information including height at a time when a mobile body including a flying mobile body moving in the air moves, the sensor data being collected in advance about each of geographical ranges, with an estimator, about each of sets of the geographical ranges and heights included in the sensor data in a predetermined time unit, a barrier state obtained by estimating a state of which of barrier types the set is;
estimating, about a set satisfying a condition among the sets, a barrier shape based on the sensor data and an estimation result of the barrier state estimated about each of the sets in the time unit; and
estimating, based on the estimation result of the barrier state estimated about the each of the sets, the estimated barrier shape, and a correct answer ratio of the estimator calculated in advance, a probability for each of the barrier types corresponding to each of the sets and estimating the barrier type corresponding to the set from the estimated probability for each of the barrier types.

REFERENCE SIGNS LIST

100 Barrier data collection device
130 Unit estimation unit
132 Shape estimation unit
134 Barrier estimation unit
140 Sensor-data storage unit
142 Insufficient-data extraction unit
150 Output unit
120 Sensor data DB
122 Map data DB
124 Barrier state DB
126 Barrier data DB

The invention claimed is:

1. A barrier data collection device comprising circuitry configured to execute a method comprising:
estimating, with an estimator based on sensor data collected from a sensor mounted on a flying mobile body, with position information including height at a time when the flying mobile body moves in the air, the sensor data being collected in advance for each of sets of geographical ranges and heights included in the sensor data in a predetermined time unit, a barrier state;

estimating, a set satisfying a condition among one or more of the sets, a barrier shape based on the sensor data and an estimation result of the barrier state estimated for each of the sets in the predetermined time unit; and estimating, based on the estimation result of the barrier state estimated for the each of the sets, the estimated barrier shape, and a correct answer ratio of the estimator calculated in advance, a probability for each of the barrier types corresponding to each of the sets and estimates the barrier type corresponding to the set from the estimated probability for each of the barrier types.

2. The barrier data collection device according to claim 1, wherein an obstacle is included in the barrier types, and the circuitry further configured to execute a method comprising:

when the condition is that a value of the obstacle in the barrier state of the set is equal to or larger than a threshold, estimating, from the sensor data, a shape and a lateral width of an object corresponding to the obstacle as the barrier shape.

3. The barrier data collection device according to claim 1, the circuitry further configured to execute a method comprising:

estimating, based on the estimation result of the barrier state estimated for each of the sets and the correct answer ratio of the estimator calculated in advance, for each of the sets, a probability for each of the barrier types, estimates the barrier type from the estimated probability for each of the barrier types, and estimates, based on the barrier type estimated for each of the sets and the barrier shape estimated for each of the sets, the barrier type at height different from the height of the set.

4. A computer-implemented method for collecting barrier data, comprising:

estimating, with an estimator based on sensor data collected from a sensor mounted on a flying mobile body, with position information including height at a time when the flying mobile body moves in the air, the sensor data being collected in advance for each of sets of geographical ranges and heights included in the sensor data in a predetermined time unit, a barrier state;

estimating, a set satisfying a condition among one or more of the sets, a barrier shape based on the sensor data and an estimation result of the barrier state estimated for each of the sets in the predetermined time unit; and estimating, based on the estimation result of the barrier state estimated for the each of the sets, the estimated barrier shape, and a correct answer ratio of the estimator calculated in advance, a probability for each of the barrier types corresponding to each of the sets and estimating the barrier type corresponding to the set from the estimated probability for each of the barrier types.

5. The computer-implemented method according to claim 4, wherein the barrier types include an obstacle, and the method further comprising:

when the condition is that a value of the obstacle in the barrier state of the set is equal to or larger than a threshold, estimating, from the sensor data, a shape and a lateral width of an object corresponding to the obstacle are estimated as the barrier shape.

6. The computer-implemented method according to claim 4, the circuitry further configured to execute a method comprising:

estimating, based on the estimation result of the barrier state estimated for each of the sets and the correct answer ratio of the estimator calculated in advance, for each of the sets, a probability for each of the barrier types, estimates the barrier type from the estimated probability for each of the barrier types, and estimates, based on the barrier type estimated for each of the sets and the barrier shape estimated for each of the sets, the barrier type at height different from the height of the set.

7. A computer-readable non-transitory recording medium storing computer-executable program instructions that when executed by a processor cause a computer to execute a method comprising:

estimating, with an estimator based on sensor data collected from a sensor mounted on a flying mobile body, with position information including height at a time when the flying moving body moves in the air, the sensor data being collected in advance for each of sets of geographical ranges and heights included in the sensor data in a predetermined time unit, a barrier state;

estimating, a set satisfying a condition among one or more of the sets, a barrier shape based on the sensor data and an estimation result of the barrier state estimated for each of the sets in the predetermined time unit; and estimating, based on the estimation result of the barrier state estimated for the each of the sets, the estimated barrier shape, and a correct answer ratio of the estimator calculated in advance, a probability for each of the barrier types corresponding to each of the sets and estimating the barrier type corresponding to the set from the estimated probability for each of the barrier types.

8. The barrier data collection device according to claim 2, the circuitry further configured to execute a method comprising:

estimating, based on the estimation result of the barrier state estimated for each of the sets and the correct answer ratio of the estimator calculated in advance, for each of the sets, a probability for each of the barrier types, estimates the barrier type from the estimated probability for each of the barrier types, and estimates, based on the barrier type estimated for each of the sets and the barrier shape estimated for each of the sets, the barrier type at height different from the height of the set.

9. The computer-implemented method according to claim 5, the circuitry further configured to execute a method comprising:

estimating, based on the estimation result of the barrier state estimated for each of the sets and the correct answer ratio of the estimator calculated in advance, for each of the sets, a probability for each of the barrier types, estimates the barrier type from the estimated probability for each of the barrier types, and estimates, based on the barrier type estimated for each of the sets and the barrier shape estimated for each of the sets, the barrier type at height different from the height of the set.

10. The computer-readable non-transitory recording medium according to claim 7, wherein
the barrier types include an obstacle, and
the method further comprising:
when the condition is that value of the obstacle in the barrier state of the set is equal to or larger than a threshold, estimating, from the sensor data, a shape and a lateral width of an object corresponding to the obstacle are estimated as the barrier shape.

11. The computer-readable non-transitory recording medium according to claim 7, the computer-executable program instructions when executed further causing the system to execute a method comprising:
estimating, based on the estimation result of the barrier state estimated for each of the sets and the correct answer ratio of the estimator calculated in advance, for each of the sets, a probability for each of the barrier types, estimates the barrier type from the estimated probability for each of the barrier types, and estimates, based on the barrier type estimated for each of the sets and the barrier shape estimated for each of the sets, the barrier type at height different from the height of the set.

12. The computer-readable non-transitory recording medium according to claim 10, the computer-executable program instructions when executed further causing the system to execute a method comprising:
estimating, based on the estimation result of the barrier state estimated for each of the sets and the correct answer ratio of the estimator calculated in advance, for each of the sets, a probability for each of the barrier types, estimates the barrier type from the estimated probability for each of the barrier types, and estimates, based on the barrier type estimated for each of the sets and the barrier shape estimated for each of the sets, the barrier type at height different from the height of the set.

* * * * *